US009207095B2

(12) United States Patent
Gunther

(10) Patent No.: US 9,207,095 B2
(45) Date of Patent: Dec. 8, 2015

(54) INTEGRATED NAVIGATION AND COLLISION AVOIDANCE SYSTEMS

(71) Applicant: Harman International Industries, Incorporated, Stamford, CT (US)

(72) Inventor: Craig Gunther, Salt Lake City, UT (US)

(73) Assignee: Harman International Industries, Incorporated, Stamford, CT (US)

( * ) Notice: Subject to any disclaimer, the term of this patent is extended or adjusted under 35 U.S.C. 154(b) by 312 days.

(21) Appl. No.: 13/839,684

(22) Filed: Mar. 15, 2013

(65) Prior Publication Data

US 2014/0278059 A1 Sep. 18, 2014

(51) Int. Cl.
*G01C 21/36* (2006.01)
*G08G 1/0968* (2006.01)
*G08G 1/16* (2006.01)

(52) U.S. Cl.
CPC ........ *G01C 21/3655* (2013.01); *G01C 21/3697* (2013.01); *G08G 1/096827* (2013.01); *G08G 1/096844* (2013.01); *G08G 1/166* (2013.01); *G08G 1/167* (2013.01)

(58) Field of Classification Search
CPC .............. B60R 21/013; B60R 21/0134; B60R 21/0132; B60R 21/0136; B60R 2021/0119; B60R 2021/01313; B60R 2021/01322; G01C 21/26; G01C 21/3697; G01C 21/3655; G06K 9/00805; Y02T 10/84; G08G 1/16; G08G 1/096844; G08G 1/167; G08G 1/096827; G08G 1/166
See application file for complete search history.

(56) References Cited

U.S. PATENT DOCUMENTS

| 7,109,854 | B2 * | 9/2006 | Dobler et al. .................. 340/435 |
| 7,259,660 | B2 * | 8/2007 | Ewerhart et al. .............. 340/436 |
| 8,013,722 | B2 * | 9/2011 | Breuer et al. .................. 340/436 |
| 2007/0200674 | A1 | 8/2007 | Moore et al. |
| 2008/0040003 | A1 | 2/2008 | Kroeninger et al. |
| 2008/0269992 | A1 * | 10/2008 | Kawasaki ....................... 701/45 |

FOREIGN PATENT DOCUMENTS

| JP | 2002238101 A | 8/2002 |
| JP | 2003141698 A | 5/2003 |

OTHER PUBLICATIONS

Hassan A. Karimi, et al., "Collaborative Navigation Systems for Collision Avoidance", Geoinformatics Laboratory, Collaborative Computing: Networking, Applications and Worksharing (CollaborateCom), 2010 6th International Conference on Oct. 9, 2010.
ISA Korean Intellectual Property Office, International Search Report and Written Opinion of PCT/US2014/026630, Jul. 4, 2014, WIPO, 17 pages.

* cited by examiner

*Primary Examiner* — James Trammell
*Assistant Examiner* — James E Stroud
(74) *Attorney, Agent, or Firm* — Alleman Hall McCoy Russell & Tuttle LLP

(57) ABSTRACT

An integrated navigation and collision avoidance system for a source object may include a navigation module and a collision avoidance module. The collision avoidance module may identify an external object that could possibly collide with the source object. The collision avoidance module may determine a likelihood of collision with the external object based on navigation information received from the navigation module. The navigation module may receive information pertaining to the likelihood of collision determination from the collision avoidance module and determine whether to include collision avoidance information and/or modify navigation instructions to generate a navigation output.

20 Claims, 4 Drawing Sheets

INTEGRATED NAVIGATION AND COLLISION AVOIDANCE SYSTEMS

BACKGROUND

1. Technical Field

This description relates to navigation and collision avoidance, and more particularly to an integrated navigation and collision avoidance system that performs a collision avoidance analysis based on navigation information and performs a navigation analysis based on collision avoidance information.

2. Background Art

Collision avoidance systems for vehicles may warn a driver if a vehicle is drifting outside a lane without using a turn signal. Also, camera and proximity sensor systems may warn or notify a driver about vehicles in close proximity when parking. The warnings or notifications may include beeps, buzzes, or vibrations in a steering wheel. Navigation systems may provide instructions or directions to reach a final destination. The instructions may be output to a driver periodically as the driver moves along a route. The instructions may be provided with disregard for or independent of the vehicle's surrounding environment.

SUMMARY

A communication system may include an integrated navigation and collision avoidance system. The communication system and/or the integrated navigation and collision avoidance system may be included or implemented with a mobile source object or system that may use, or have an operator that uses, navigation and collision avoidance information. An example mobile system or object may be a vehicle.

The integrated navigation and collision avoidance system may include a navigation module and a collision avoidance module. Each of the modules may be configured to perform a respective analysis that is based on information received from the other module. That is, the navigation module may perform a navigation analysis based on collision avoidance information, and the collision avoidance module may perform a collision avoidance analysis based on navigation information.

The collision avoidance module may continually monitor for possible collisions with external objects in a surrounding environment of the source object. The collision avoidance module may receive information indicative of conditions of the source object and its surrounding environment. The information may be obtained from information gathering systems, such as camera systems or sensor systems. In addition, the information may be processed, such as by an image analysis system, prior to being sent to the collision avoidance module. The collision avoidance module may also receive navigation information from the navigation module. The navigation information may include upcoming or pending instructions or navigations that the navigation module intends to output.

Upon identification of an external object in the surrounding environment, the collision avoidance module may assess or determine a likelihood of collision of the source object with the external object. The collision avoidance module may consider or take into account the navigation information. For example, the collision avoidance module may determine a likelihood of collision with the external object in event that the source object follows the navigation instructions.

The collision avoidance module may also be configured to divide the surrounding environment into zones. The zones may be divided based on a degree of likelihood of collision with an external object. The zones may also be divided with reference to a distance away from the source object. The collision avoidance module may be configured to assess the likelihood of collision based on the external object's position within a zone, in addition to other conditions or properties of the external object, such as the external object's speed or direction of movement.

The collision avoidance module may be configured to send collision avoidance information generated from the collision avoidance analysis to the navigation module. The collision avoidance information may include the likelihood of collision determination and/or information about the external object in the source object's surrounding environment. The collision avoidance module may be configured to send a collision avoidance output to other systems or components of the source object, such as to an output system for warning or notification of a possible collision, or to a storage system for recordation of the source's objects surrounding environment around the time of an imminent collision.

The navigation module may be configured to generate a navigation output in response to receipt of the collision avoidance information from the collision avoidance module. The navigation module may modify the navigations instructions based on the to collision avoidance information. In addition or alternatively, the navigation module may include the collision avoidance information in the navigation output, such as information about the external object. In addition or alternatively, the navigation module may adjust a timing of the navigation output.

The integrated navigation and collision avoidance may provide enhanced or improved safety features or systems for vehicles. For example, navigation systems may provide smarter navigations instructions that are less likely to lead to accidents.

Other systems, method, features and advantages will be, or will become, apparent to one with skill in the art upon examination of the following figures and detailed description. It is intended that all such additional systems, method, features and advantages be included within this description, be within the scope of the description, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles described in the description. Moreover, in the figures, like referenced numerals designate corresponding parts throughout the different views.

DETAILED DESCRIPTION OF EMBODIMENTS

The present description describes an integrated navigation and collision avoidance system that may perform navigation and collision avoidance analyses based on each other. By being integrated, the integrated navigation and collision avoidance system may perform a navigation analysis using collision avoidance information, and may perform a collision avoidance analysis using navigation information. The navigation analysis and the collision avoidance analysis may be performed for the same object or group of objects, such as a vehicle. The integrated navigation and collision avoidance system may be included as part of a communication system and/or a vehicle system for which navigation and collision avoidance information may be used.

Figure 1:
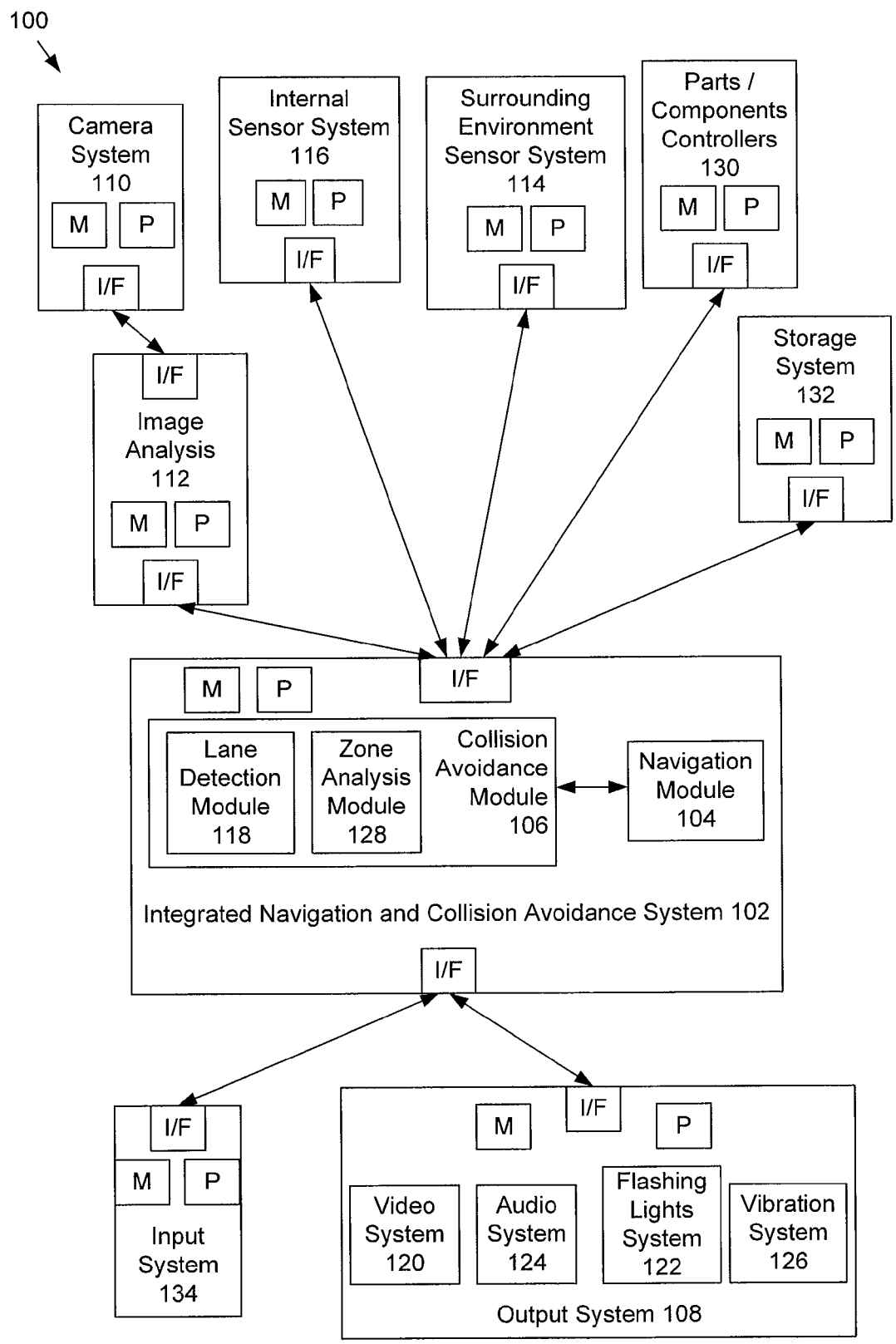
FIG. 1 is a block diagram of an example communication system that includes an integrated navigation and collision avoidance system.

FIG. 1 shows a block diagram of an example communication system 100 that may include an integrated navigation and collision avoidance system 102. The integrated navigation and collision avoidance system 102 may include a navigation module 104 and a collision avoidance module 106. The navigation module 104 may be configured to perform a navigation analysis. For example, the navigation module 104 may determine one or more routes to a destination or a plurality of destinations. The navigation module 104 may further determine a current location of a vehicle, pedestrian, or other mobile object for which the integrated navigation and collision avoidance system 102 may be used. The navigation module 104 may further determine navigation instructions or directions to the destination location and may decide to maintain or modify the directions based on the current location. The navigation analysis may include additional determinations or decisions, as described in further detail below.

In addition, the navigation module 104 may be configured to provide a navigation output, which may include navigation instructions or directions. The navigation output may be sent to an output system 108 of the communication system 100, where the navigation output may be displayed and/or output for receipt by a user of the integrated navigation and collision avoidance system 102. In addition or alternatively, the navigation output may be communicated to the collision avoidance module 106 for use by the collision avoidance module 106.

The collision avoidance module 106 may be configured to perform a collision avoidance analysis. The collision avoidance analysis may include a determination of a probability or a likelihood of a collision. The collision avoidance analysis may also include an avoidance determination, which may include a determination to generate and output a collision avoidance output to warn or notify of a possible collision, or include instructions as to the possible collision, in order to avoid the possible collision.

The collision avoidance analysis may be performed for a mobile source or source object that may be using the integrated navigation and collision avoidance system 102 for navigation and/or collision avoidance information. The source object may be any mobile object or object capable of being mobile that may use, operate, or implement the integrated navigation and collision avoidance system 102. Example source objects may include a vehicle or other mobile machine, an operator of the vehicle, or a pedestrian. The source object may include a single object or a plurality of objects, such as a group of motorcycles or a group of joggers, as examples.

The collision avoidance analysis may also be performed relative to another object. The other object may be any object, moving or stationary, that may be external to the source object and that may cause or have the potential to cause a collision with the source object. That external object may also be an object that is within an identified or predetermined surrounding environment of the source object, as described in further detail below. Example external objects may include another vehicle, a tree, an animal, a telephone pole, or a pedestrian, as examples. Various other types of external objects may be identified.

The collision avoidance module 106 may be configured to perform the collision avoidance analysis based on and/or using information indicative of a surrounding environment of the source object. The surrounding environment may vary in size, shape and/or dimensions, which may depend on the source object and/or the types of external objects that are likely to cause a collision with the source object. For example, the surrounding environment may be large enough to include an area in which external objects that may be likely to cause a collision with the source object may be found or may be likely to enter.

As an illustration, the surrounding environment for a car may be generally around the car from the road to a predetermined distance above the road. The surrounding environment may be large enough to include areas around the car in which external objects likely to collide with the car may exist, such as areas directly ahead of the car, directly behind the car, and in traffic lanes next to the car. As another illustration, the surrounding environment for a boat may include both above-water and underwater environments, as the boat may be concerned with colliding with underwater objects, such as rocks, as well as above-water or surface-level objects such as other boats. Various types of surrounding environments may be identified for different types of source objects.

The communication system 100 may include one or more information gathering systems that may gather and/or capture information indicative of the source object's surrounding environment, conditions of the surrounding environment, and/or information identifying properties, conditions, or characteristics of the source object. The information gathering systems may gather and/or capture the information continuously and/or over multiple time intervals in order to assess the surrounding environment and/or the properties or conditions of the source object as the source object moves and/or as the surrounding environment changes.

One type of information gathering system may include a camera system 110. The camera system 110 may include one or more cameras, such as high speed cameras, that are configured to capture and/or record images, including still images and/or moving images, of the source object's surrounding environment. The cameras may be positioned on the source object or in positions relative to the source object that enable the cameras to completely or adequately capture the surrounding environment. As an example, for a vehicle, the cameras may be mounted on various parts of the vehicle in order to adequately capture the vehicle's surrounding environment.

The camera system 110 may be configured to send the captured image information or data to an image analysis system 112. The image analysis system 112 may be configured to analyze the image data received from the camera system 110 and identify or detect the presence or absence of external objects in the surrounding environment. The image analysis system 112 may also distinguish external objects that have the potential to cause a collision with the source object from other objects, noise, or background portions of the images, such as the sky or off-road terrain, that may not be an external object within the surrounding environment that is likely to cause a collision. In addition or alternatively, the image analysis system 112 may identify a type of the external object and/or distinguish the external object from other types of external objects. For example, the image analysis system 112 may identify an external object as a car and distinguish the car from other types of external objects, such as a person or an animal.

In addition or alternatively, the image analysis system 112 may determine a rate and/or a direction of movement of the external object relative to the source object, or of the source object relative to the external object. For example, the image analysis system may determine whether the external object is moving toward or away from the source object, and at what speed or acceleration. Also, the image analysis system 112 may determine a position or multiple positions of the external object relative to the source object. In some example configurations, the image analysis system 112 may be configured to combine several portions of image data received from several cameras of the camera system 110 in order to construct a complete image or view of the surrounding environment.

The image analysis system 112 may include or be implemented with various image detection or other image processing algorithms to perform the image detections and determinations. In addition, the camera system 110 may send and the image analysis system 110 may receive the image data continually or on a continuous basis so that the camera system 110 and the image analysis system 112, together, continuously monitor the surrounding environment of the source object as the source object moves and/or the surrounding environment changes.

The image analysis system 112 may be configured to send information regarding the image analysis to the integrated navigation and collision avoidance system 102, including the collision avoidance module 106. In response to receipt of the image analysis information, the collision avoidance module 106 may use the image analysis information to perform a collision avoidance analysis. For example, the collision avoidance module 106 may determine a probability or a likelihood of a collision of the source object with an external object identified in the image analysis. Various properties or conditions of the surrounding environment identified in the image analysis, including an external objects type, position, movement direction, and speed, may be considered by the collision avoidance module 106 to perform the collision avoidance analysis.

The information gathering systems may include other systems in addition to the camera system 110. For example, the information gathering systems may include a surrounding environment sensor system 114 that includes one or more sensors that are configured to respond to the surrounding environment to detect external objects in the surrounding environment. The surrounding environment sensor system 114 may have sensors of the same type or of different types.

An example surrounding environment sensor system 114 may include one or more proximity sensors that may be configured to detect the presence or absence of external objects without physical contact. The proximity sensors may perform the detection using a variety of sensing techniques, such as electromagnetic radiation (e.g., infrared), capacitive, Doppler effect, inductive, sonar, or radar, as examples. In addition or alternatively, sensors other than proximity sensors may be included in the surrounding environment sensor system 114. Other types of sensors may include audio sensors or microphones configured to detect sound, and/or gas sensors configured to detect a particular gas. Still other types of sensors may detect weather conditions of the surrounding environment, such as the temperature, or whether the conditions are snowy, rainy, foggy, sunny, etc. Various other types of sensors may be used, depending on the type of source object and/or the types of external objects. The surrounding environment sensor system 114 may further include a processor or communicate with a processor, such as a processor P, that is configured to process the response of the sensors to determine and/or identify the detections sensed by the sensors.

The information gathering systems may further include an internal sensing system 116 that is configured to determine or identify one or more properties, conditions, statuses, or health of the source object. The properties, conditions, or statuses may include the speed or direction in which the source object is moving, or an operating temperature of the source object. Other sensors may identify usage, positioning, or health of various components of the source object. As an illustration, internal sensors on a car may detect a speed of the car, a position of the steering wheel, turn signal usage, engine temperature, oil level, tire health, or brake life, as examples. In some example configurations, some or all of the sensors included in the internal sensing system 116 may be the same as some or all of the sensors included in the surrounding environment sensing system 114. Various configurations are possible.

The surrounding environment sensor system 114 and the internal sensing system 116 may be configured to send sensor data to the integrated navigation and collision avoidance system 102, including the collision avoidance module 106. The collision avoidance module 106 may use the surrounding environment sensor data and/or the internal sensor data to perform a collision avoidance analysis.

The collision avoidance module 106 may include various sub-modules that are configured to perform various collision avoidance analyses. One sub-module for a vehicle may include a lane detection module 118 that may be configured to detect when the vehicle is veering away from a current lane or changing lanes unintentionally or undesirably, such as when a driver falls asleep or is otherwise not paying attention to the road. The lane detection module 118 may perform the detection by identifying a change in lanes without use of a turn signal, by identifying a speed or direction in which the change is occurring, and/or by identifying that the vehicle is moving off the road or to a portion of the road that is not considered a lane, such as a shoulder.

Once the lane detection module 118 identifies the lane change, an output identifying the lane change may be sent to the output system 108, such as in the form of a notification or a warning. The output system 108 may output the notification or warning to an operator of the vehicle that the vehicle is veering away from the current lane or off the road. Various types of outputs may be generated, depending on the types of output components included in the output system 108. For example, the output from the output system 108 may be a video output that is displayed with a video system 120, which may include a graphics processor and/or a display or monitor; a light warning flashed with a flashing lights system 122; an audio output produced with an audio system 124, which may include speakers and/or an amplification system; and/or a vibration output generated with a vibration system 126, which may be attached to or integrated with a vehicle part, such as a steering wheel or a seat. The lane detection module 118 may also provide an output identifying the lane change to other collision avoidance sub-modules, such as a zone analysis module 128.

The zone analysis module 128 may be configured to separate or divide the surrounding environment into different spatial zones. The different zones may be determined or identified based on different likelihoods of a collision or different levels of imminence of a collision. For example, a first zone may be identified as having a greater likelihood of a collision than a second zone if an external object is more likely to collide with the source object in the first zone than in the second zone. The zones may be identified under the presumption that the properties or characteristics of the external object in the zones, other than its spatial position in the surrounding environment relative to the source object, are the same.

The zone analysis module 128 may separate the surrounding environment into any number of spatial zones, with the number of zones being at least two. In addition, the zones may have any types of shapes, such as round shapes, including circular shapes or oval shapes. Other shapes, such as rectangular shapes, polygonal shapes, or amorphous shapes may also or alternatively be used. The shapes may be the same or different for the different zones. For some example configurations, the shapes may be concentric with each other and/or centered with respect to the source object. In addition, the zones may be identified or arranged based on a distance relative to the source object, with a greater likelihood of collision existing for zones that are closer to the source object. In addition or alternatively, the zones may be identified based on probability ranges. As an example, for a surrounding environment divided into three zones, an external object in the first zone may be within a first probability range of collision (e.g. greater than 80%), the external object in the second zone may be within a second probability range of collision (e.g., 79.9% to 50%), and the external object in the third zone may be within a third probability range of collision (e.g., less than 50%). In addition to or instead of being identified by ranges, the zones may be identified by levels or ratings. For example, the first zone may have a high level or rating indicative of a highest probability or likelihood of collision, the second zone may have an intermediate level or rating indicative of an intermediate probability or likelihood of collision, and the third zone may have a low level or rating indicative of the lowest probability or likelihood of collision.

In addition or alternatively, the zones may be determined based on the sensor data received from the surrounding environment sensor system 114 and/or the internal sensor system 116. For example, the zones may be determined based on a speed of the source object. The size of the zone nearest a source object may be larger for faster moving source objects. As another example, the zones may be determined based on the weather conditions of the surrounding environment. A zone nearest a source object may be larger for a source object moving in dark, snowy conditions than a source object moving in sunny, dry conditions.

In addition or alternatively, the zones, and/or the surrounding environment itself, may be determined based on navigation information received from the navigation module 104. For example, the navigation module 104 may provide a current location or a geographic location of the source object, or other information such as traffic information to the zone analysis module 128. Characteristics, such as the sizes, shapes, or numbers of the zones may be determined based on the information from the navigation module 104. As an illustration, information from the navigation module 104 indicating that a car is on a one-way road may determine a surrounding environment and/or zones that are narrower compared to a surrounding environment and/or zones determined for a car on a four-lane highway. As another illustration, a higher number of zones may be determined for higher congested traffic conditions, as compared to lower congested traffic conditions. Various configurations are possible.

In addition or alternatively, the zones may be dynamic, and may depend on any number of various changing factors, such as a change in speed of the source object, a change in direction of the source object, a change in navigation information, or a change in travel conditions, such as weather conditions around the source object, road conditions (e.g., the road or highway on which the source object is travelling) or traffic conditions, as examples.

The zone analysis module 128 may also be configured to perform a collision avoidance analysis based on the zones. In particular, the zone analysis module 128 may make collision avoidance determinations by analyzing information received from various sources, including information or data obtained from the information gathering systems, information received from other sub-modules of the collision avoidance module 106, and/or navigation information received from the navigation module 104. The zone analysis may be performed in view of and/or with reference to the zones. The collision avoidance determinations may include an identification of the presence and/or characteristics or conditions of external objects in the surrounding environment, probability determinations of a collision of the source object with identified external objects, collision types of identified possible collisions, and determinations of a collision avoidance output based on identification of external objects and their associated characteristics or conditions, the probability determinations, and/or the collision types.

To identify the presence and/or characteristics of external objects in the surrounding environment, the zone analysis module 128 may use the image analysis information received from the image analysis system 112 and/or sensor data received from the surrounding environment sensor system 114. With the image analysis information and/or the sensor data, the zone analysis module 128 may identify whether an external object is within the surrounding environment and in which zone. The zone analysis module 128 may further determine a particular position of the external object in the surrounding environment, which may include a particular position in a zone and/or whether the external object's position overlaps two or more zones. The zone analysis module 128 may also use the image analysis information to identify a direction and/or a rate of movement of the external object relative to the source object (or a direction and/or a rate of movement of the source object relative to the external object, such as for stationary external objects). From the direction and/or rate of movement data, the zone analysis module 128 may determine the external object's relative movement in the surrounding environment, the external object's relative movement in a particular zone, whether the external object is entering or leaving a zone, and/or whether the external object is moving closer to or away from the source object. In addition or alternatively, the zone analysis module 128 may use the image analysis information to determine a type of the external object that is in the zones.

Based on the determinations of the presence and/or characteristics or conditions of external objects in the surrounding environment, the zone analysis module 128 may determine a probability or likelihood of collision of the source object with an external object identified in the surrounding environment. The probability determination may be quantitative, such as a percent likelihood or a range of percentages of likelihoods of a collision. In addition or alternatively, the probability determination may be qualitative, such as by designating a likelihood of collision as high, medium, or low.

Information other than information identifying the presence of an external object in the surrounding environment and/or characteristics or conditions of the identified external object may be factored into the probability determination. For example, the probability determination may be based on sensor data sensed by the surrounding environment sensor system 114 and/or the internal sensor system 116, such as data identifying the weather conditions, road conditions, traffic conditions, or properties of the source object.

In addition or alternatively, the probability determination may be based on navigation information received from the navigation module 104. The navigation information may include pending navigation instructions or directions. Pending navigation instructions or directions may include navigation instructions or directions that have not yet been output or provided by the navigation module 104 and/or that have not yet been followed by an operator or user of the integrated navigation and collision avoidance system 102. Additionally, the pending navigation instructions or directions may include navigation instructions or directions that are to be output by the navigation module 104 or that are to be followed by an operator or user when the source object is at or near an upcoming geographical location or is calculated to be within a predetermined distance or time period from being at the upcoming geographic location. The pending navigation instructions or directions may include instructions or directions to move to a next geographical location—such as instructions or directions to turn onto a next road, to change into a next traffic lane, or to exit a highway onto an off ramp, as examples—when the source object is at the upcoming geographical location. In some example configurations, the upcoming geographical location and/or the next geographical location may be within the surrounding environment.

As an illustration, the navigation information may include instructions for a source car to move into a next lane when the source car reaches an upcoming geographical location. The zone analysis module 128 may have identified another car in the surrounding environment that is in the next lane. The probability determination made by the zone analysis module 128 may include a probability determination of a collision of the source car with the other car in the next lane if the source car moves into the next lane in accordance with the navigation instructions.

In addition or alternatively, the probability determination may be based on information received from the lane detection sub-module 118. As explained above, the information received from the lane detection sub-module 118 may include an indication that a source vehicle is unintentionally performing a lane change. If the zone analysis module 128 identifies an external object in a zone while the unintended lane change is being performed, the zone analysis module 128 may determine a probability of a collision with the external object based on the information that the lane change is unintended.

The zone analysis module 128 may further be configured to determine a type of the possible collision, which may include an area of impact on the source object, the types of the source and external objects that may be involved in the collision, and/or an amount or type of damage that may result from the collision. The type of collision may be determined based on the image analysis information and/or the sensor data identifying received by the zone analysis module 128.

The zone analysis module 128 may further be configured to determine whether to generate a collision avoidance output based on the probability determination. As previously described, the collision avoidance output may be of a type and/or include content to warn or notify of a possible collision, or include instructions as to the possible collision, in order to avoid the possible collision. The zone analysis module 128 may determine not to generate a collision avoidance output in the event that the zone analysis module 128 does not identify an external object in one of the zones of the surrounding environment, in which case there may be a zero likelihood of a collision.

In addition, the zone analysis module 128 may determine whether to generate a collision avoidance output based on a level or value of the probability determination and/or whether the level or value of the probability determination falls below a predetermined threshold. The predetermined threshold may be indicative of whether or not notification or warning of a possible collision is warranted or desirable. If the probability determination falls below the predetermined threshold, then the zone analysis module 128 may determine not to generate a collision avoidance output, indicating that a likelihood of collision is too low to warrant a notification or warning of a possible collision. Alternatively, if the probability determination meets or exceeds the predetermine threshold, then the zone analysis module 128 may determine to generate and output a collision avoidance output, indicating that a notification or warning of the possible collision is warranted.

In response to determining to generate a collision avoidance output, the zone analysis module 128 may further be configured to determine where to send the collision avoidance output. For example, the zone analysis module 128 may determine to send the collision avoidance output to the output system 108 for output to a user or operator to warn or notify of the possible collision. In addition or alternatively, the zone analysis module 128 may determine to send the collision avoidance output as control information to one or more parts or components controllers 130 of the source object to navigate the source object away from the collision, to warn or notify an external object of the collision, or to activate a safety component of the source object. In addition or alternatively, the zone analysis module 128 may determine to send a collision avoidance output to a storage system 132, such as a black box, for recordation which may include information or details as to the possible collision. In addition or alternatively, the zone analysis module may determine to send a collision avoidance output to the navigation module 104, which may use the collision avoidance output to generate navigation information.

The zone analysis module 128 may determine where to send the collision avoidance output based on the type of the possible collision. As examples, the zone analysis module 128 may determine where to send the collision avoidance output based on where the possible impact area of the source object may be, the types of the source and external objects that may be involved in the collision, or the amount of damage that may be involved in the collision. In addition or alternatively, the zone analysis module 128 may determine where to send the collision avoidance output based on a level of the probability determination, which may be a level above and/or away from the predetermined threshold. For example, the zone analysis module 128 may determine to send the collision avoidance output to all components of the output system 108, the storage system 132, and the navigation module 104 in response to a probability determination having a level indicative of a high likelihood of a collision. Alternatively, for a level indicative of an intermediate likelihood of a collision, the zone analysis module 128 may determine to send a collision avoidance output only as a video output to the display 120 and to the navigation module 104. As another example, the zone analysis module 128 may determine where to send the collision avoidance output based on which zone the external object may be located. For example, the zone analysis module 128 may determine to send the collision avoidance output to the storage system 132 only if an external object is within a particular zone, such as the zone or a couple of zones closest to the source object. Various configurations are possible.

The zone analysis module 128 may also be configured to determine a type and/or content of the collision avoidance output depending on where the collision avoidance output is being sent. For example, in response to determining to send the collision avoidance output to the output system 108, the type and/or content of the collision avoidance output may depend on the component of the output system 108 to which the collision avoidance output is being sent. As examples, the collision avoidance output may include a video output that is displayed with the display or monitor 120. The contents of the video output may include words describing the possible collision and/or instructions to avoid the collision. In addition or alternatively, the video output may include a graphical display indicating the possible collision. The graphical display may include the surrounding environment, the zones, and the external object in the surrounding environment, as an example. In addition or alternatively, the collision avoidance output may include an audio output generated with the audio system 124. The audio output may include an audible sound, such as a warning sound. In addition or alternatively, the audio output may include audible words describing the possible collision and/or instructions to avoid the collision. In addition or alternatively, the collision avoidance output may include a light warning indicative of the possible collision that may be output with the flashing lights 122. In addition or alternatively, the collision avoidance output may include a vibration output generated with the vibration system 126.

In addition, in response to determining to send the collision avoidance output as control information to one or more parts or components controllers 130 of the source object, the type and/or content of the control information may depend on the particular parts for which the control information is being sent. Example parts controllers 130 may include a steering wheel controller to control steering of the steering wheel, a brakes system controller to control braking, a turn signal controller to control activation of turn signals, a horn controller to controller activation or a horn, a head lights controller to control activation of head lights, and/or an airbag controller to control activation of an air bag system, as examples.

Additionally, in response to determining to send the collision avoidance output to the storage system 132, the content of the collision avoidance output may include information obtained from the information gathering systems, such as information identifying properties or a status of the source object (e.g., a speed of the source object), information identifying external objects in the zones and their associated properties or characteristics, and/or other environmental conditions of the surrounding environment, as examples.

In addition, in response to determining to send the collision avoidance output to the navigation module 104, the content of the collision avoidance output may include information that the navigation module 104 may use to generate and/or output a navigation output. The content of the collision avoidance output may include any information received and/or generated by the zone analysis module 128, including identification of external objects and their associated properties or characteristics, probability determinations of possible collisions, and/or collision types of the possible collisions, as described above.

The zone analysis module 128 may continually perform a collision avoidance analysis as the zone analysis module 128 continually receives updated information and the surrounding environment and/or the properties or conditions of the source object and the surrounding environment changes. As such, the zone analysis module 128 may continually analyze the surrounding environment of the source object to identify the presence and/or characteristics of external objects in the surrounding environment, make probability determinations of a collision with the source object and the identified external objects, determine collision types of identified possible collisions, and provide collision avoidance outputs to various devices, systems, or modules within the communication system 100.

The navigation module 104 may be generally configured to perform navigation functions. In particular, the navigation module 104 may be configured to receive, utilize, or determine geographic information, including a current geographic location of the source object. The navigation module 104 may determine the geographic information through the use of various techniques or systems, such as global position systems (GPS), satellite systems, triangulation methods, and/or cellular systems, as examples. The geographic information may also be determined by receipt of information from a user of the integrated navigation and collision avoidance system 102 and/or through access of information stored in memory.

The navigation module 104 may also be configured to determine a destination location or address of the source object. The navigation module 104 may receive destination location information that was input to the communication system 100 using an input system 134. The input system 134 may include various input devices or components, such as a touch screen, a keyboard, a mouse, a joystick, or a microphone, as examples. Further, the navigation module 104 may be configured to determine one or more routes, including a best route, to the destination location. The navigation module 104 may also be configured to determine navigation directions or instructions to the destination location. The navigation instructions or directions may be associated with the routes.

In addition, the navigation module 104 may be configured to send route information and/or the navigation directions or instructions to one or more components of the output system 108, such as the video system 120 and/or the audio system 124 for output to a user of the integrated navigation and collision avoidance system 102. The navigation module 104 may be configured to continually update, modify, and/or output the routes and/or navigation instructions or directions based on a current geographic location of the source object.

The navigation module 104 may be configured to use or access various geographic and/or cartographic data to perform its functions. The geographic and/or cartographic data may include data corresponding to geographic locations, such as map data, map elements (e.g., roads, streets, highways, intersections), terrain, points of interest, and/or other types of navigation data.

The navigation module 104 may communicate with the collision avoidance module 106, including the zone analysis module 128 and/or the lane detection module 118, to perform their respective functions. The navigation module 104 may send navigation information to the zone analysis module 128, which the zone analysis module 128 may use when performing a collision avoidance analysis, as previously described. The navigation module 104 may continually provide navigation information to the collision avoidance module 106 and/or to the zone analysis module 128 as the navigation module 104 continually performs navigation functions, such as determines updated or pending navigation directions and/or determines a new current location of the source object.

In addition, the navigation module 104 may receive a collision avoidance output from the collision avoidance module 106 and/or the zone analysis system 128. The navigation module 104 may use the information or content included in the collision avoidance output to perform a navigation analysis and/or generate a navigation output. That is, the navigation module 104 may be configured to make a navigation determination and/or generate a navigation output for transmission to the output system 108 that is based on the information or content received in the collision avoidance output. The navigation module 104 may be configured to analyze or consider the collision avoidance information prior to generating a navigation output. For some example configurations, the collision avoidance information may include a likelihood of collision with an external object in event the source object follows pending navigation instructions. The navigation module 104 may analyze or consider the likelihood determination, and in response, may determine to modify existing navigation instructions, include collision avoidance information into the navigation output, or adjust a timing of the navigation output to generate a navigation output in response to receipt of the collision avoidance output.

In further detail, the navigation module 104 may be configured to directly include information in the navigation output that was included in the collision avoidance output. As an example, the content of the collision avoidance output may include information identifying an external object and one or more properties or conditions associated with the external object, such as its location or position relative to the source object or the external object's type, as examples. The navigation output generated by the navigation module 104 may include the information identifying the external object and its position relative to the source object.

In addition or alternatively, the navigation module 104 may be configured to identify or select terms, words, or phrases to include in the navigation output that may be based on the information or content included in the collision avoidance output. The terms or words may be identified or selected based on an association with the information or content included in the collision avoidance output. For example, the terms or words selected may correspond to and/or be correlated with a degree of imminence or likelihood of collision indicated in the content received from the zone analysis module 128.

As an example, the collision avoidance output may include a probability determination indicating a level or degree of likelihood of collision with an external object. The navigation module 104 may select a word or phrase associated with the probability determination to include in the navigation output. In one example, the navigation module 104 may determine to include the word "warning" in the navigation output in response to a high degree of likelihood of a collision with an external object. Alternatively, the navigation module 104 may determine to include the word "caution" in the navigation output in response to a medium degree of likelihood of a collision with an external object. As another example, the navigation module 104 may select or choose terms or words that are associated with zones in which an external object is located. For example, the navigation module 104 may include a term such as "warning" in a navigation output when an external object is in a first zone, and a different term, such as "caution" when an external object is in a second zone, the first zone being closer to the source object than the second zone. Words or terms other than "warning" and "caution" may be used. In addition or alternatively, the navigation module 104 may determine to withhold or choose not to select words or terms to include in the navigation output based on content received from the zone analysis module 128. For example, the navigation module 104 may determine not to output any terms such as "caution" or "warning" in response to a probability determination identifying a low likelihood of collision. Various configurations are possible.

In addition or alternatively, the navigation module 104 may be configured to determine whether or not to output a navigation output, determine whether to alter navigation instructions, and/or to determine a timing of when to output a navigation output based on the content or information included in the collision avoidance output. As an illustration, the content may include information indicating a high degree of likelihood of collision with an external object if a navigation instruction is carried out by the source object. In response to the high degree of likelihood, the navigation module 104 may determine to withhold and/or terminate output of the navigation output. In addition or alternatively, the navigation module 104 may determine to alter the navigation directions and output the altered directions. The altered directions may be output instead of directions determined prior to receipt of the collision avoidance information. In addition or alternatively, the navigation module 104 may determine a timing for which to output the navigation output based on the high degree of likelihood of the collision. For example, the navigation module 104 may determine to delay output of the navigation output until a later time from an initially intended time of output, such as after an external object moves away from a particular zone and there is no longer a high degree of likelihood of a collision.

Figure 2:
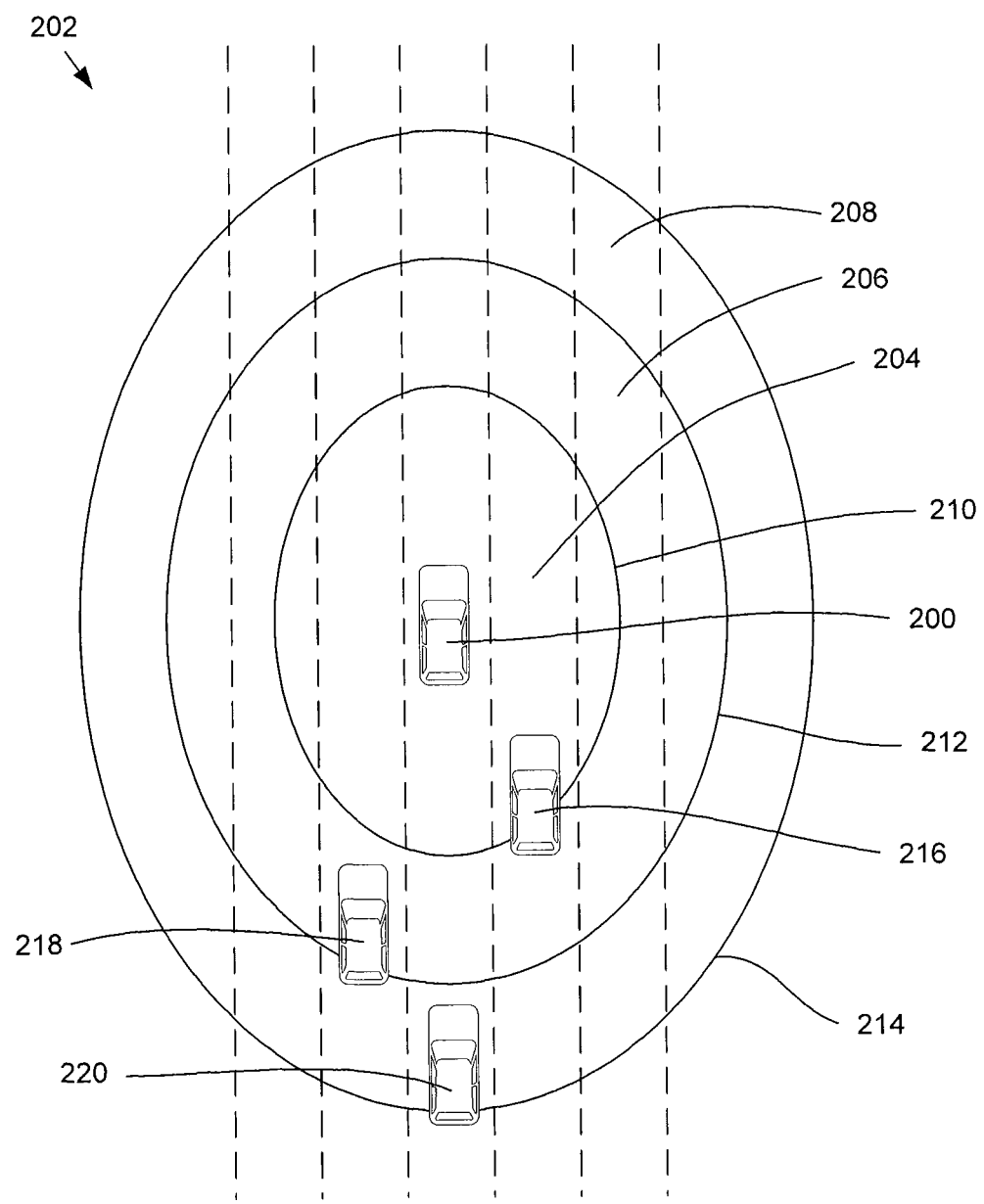
FIG. 2 is a diagram of an example surrounding environment of a vehicle.

An example implementation of the integrated navigation and collision avoidance system 102 is now described for a vehicle with reference to FIG. 2. FIG. 2 shows a diagram of a vehicle 200 and a surrounding environment 202 of the vehicle 200. The integrated navigation and collision avoidance system 102 as described above with reference to FIG. 1 may be included as part of a vehicle system of the vehicle 200. The surrounding environment 202, including the shape and/or size, may be determined by the zone analysis module 128. The zone analysis module 128 may also divide the surrounding environment into zones. As shown in FIG. 2, the surrounding environment 202 is divided into three zones, including a first zone 204, a second zone 206, and a third zone 208. The zones 204, 206, and 208 are generally oval shaped and surround the vehicle 200. In addition, the zones 204, 206, 208 are concentric with each other and are generally or substantially centered with the vehicle 200. A first boundary 210 may separate the first zone 204 from the second zone 206, and a second boundary 212 may separate the second zone 206 from the third zone 208. A third, outer boundary 214 may define an outer bound of the surrounding environment 202.

The zone analysis module 128 may receive information about the vehicle 200 and/or the surrounding environment 202 obtained from information gathering systems, which may be mounted to the vehicle 200. For example, the zone analysis module 128 may receive image analysis information from the information analysis system 112 identifying three external objects 216, 218, 220 within the surrounding environment 202. The information may further identify the external objects 216, 218, 220 as vehicles. The information may identify other properties of the external objects 216, 218, 220, such as their speed and/or direction of movement relative to the vehicle 200.

In response to the received information, the zone analysis module 128 may perform a collision avoidance analysis with reference to the zones 204, 206, 208. In addition, the collision avoidance analysis may be performed for each of the external vehicles 216, 218, 220. For example, the zone analysis module 128 may identify the first vehicle 216 as being partially in the first zone 204 and partially in the second zone 206. In addition, the zone analysis module 128 may identify the first vehicle as being located in a traffic lane immediately to the right and to the rear of the vehicle 200. The zone analysis module 128 may further perform a probability determination that includes a probability or likelihood of collision with the first vehicle 216. As explained above, the zone analysis module 128 may consider a pending navigation instruction when making the probability determination. For example, if a pending navigation instruction includes instructing the vehicle 200 to move into the right lane, the zone analysis module 128 may find an increased likelihood of collision than if there are no pending navigation instructions and/or the pending navigation instructions are to stay in the current lane or move to the left lane. The zone analysis module 128 may continually identify a position of the first vehicle 206 and perform probability determinations for the first vehicle 206. If, for example, the vehicle 200 begins to move into the right lane, the zone analysis module 128 may determine that a probability of collision has exceeded a threshold level. In response, the zone analysis module 128 may provide a collision avoidance output to an output system 108 of the vehicle 200 to warn or notify an operator of the vehicle 200 of the other vehicle 216.

In addition, the zone analysis module may send collision avoidance information about the vehicle 216 to the navigation module 104. In an example situation, the navigation module 104 may determine to generate and/or output a navigation instruction to an operator of the vehicle 200 to move into the right lane. In response and/or before providing the navigation output to the operator, the navigation module 104 may analyze the collision avoidance information received from the zone analysis module 128 and generate a navigation output that is based on the collision avoidance information. For example, in addition to navigation instructions, the navigation module 104 may include in the navigation output information that identifies the vehicle 216 and/or a position of the vehicle 216. In addition, the navigation output may include words or terms that are associated with the vehicle 216 being at least partly in the first zone 204 closest to the vehicle. An example navigation output may include: "Warning. There is a vehicle immediate to your right. After the right lane becomes clear, move into that lane and prepare to turn right onto Main Street. Main Street exit is in 1 mile." Alternatively, the navigation module 104 may determine not to output a navigation output at all or provide a different instruction, such as "Do not move into the right lane. Remain in the current lane and wait for further instructions." Alternatively, the navigation module 104 may wait to output the initial instruction, such as if the vehicle 216 moves further away from the vehicle 200, into the second or third zones 206, 208.

Similar operations and communications may be performed with the zone analysis module 128 and the navigation module 104 for the second and third vehicles 218, 220. If for example, the navigation module 104 determines to provide a navigation output instructing an operator of the vehicle 200 to move into the left lane, the navigation module 104 may analyze collision avoidance information received from the zone analysis module 128 identifying the vehicle 218 to the rear of the vehicle 200 in the left lane and overlapping in the second and third zones 206, 208. In response, the navigation module 104 may provide a navigation output, such as: "Caution. There is a vehicle approaching to your left. Move into left lane and exit onto Main Street if left lane is clear. Main Street exit is in 1 mile." In this example situation, "caution" may be selected instead of "warning" because the second vehicle 218 is overlapping in the second and third zones 206, 208 instead of in the first and second zones 204, 206. Words other than "warning" and "caution" may be used.

As another example, if the second vehicle 218 was not in the surrounding environment and the navigation module 104 determined to output the navigation instruction to move into the left lane, the navigation module 104 may use the collision avoidance information to identify the first vehicle 216 in the right lane and the third vehicle 220 in the current lane of the vehicle 200 and in the outer-most zone 208. In addition, the navigation module 104 may use the collision avoidance information to identify little or no likelihood of a collision if the vehicle 200 moves into the left lane. As such, the navigation module 104 may generate a navigation output that that does not include collision avoidance information. An example navigation output for this example may include: "Move into the left lane and exit onto Main Street. Main Street is in 1 mile."

Referring back to FIG. 1, one or more of the systems included in the communication system 100, including the integrated navigation and collision avoidance system 102, the output system 108, the camera system 110, the image analysis system 112, the surrounding environment sensor system 114, the internal sensor system 116, the parts or components controllers 130, the storage system 132, and input system 134 may include and/or communicate with a processor P configured to perform the above described functions. The processor P may be a general processor, a digital signal processor, a controller, a microcontroller, an application specific integrated circuit, a field programmable gate array, an analog circuit, a digital circuit, combinations thereof, or other now known or later developed processors. The processor P may be a single device, a plurality of devices, or a combination of devices, such as associated with a network or distributed processing. Any of various processing strategies may be used, such as multi-processing, multi-tasking, parallel processing, remote processing, or the like. The processor P may be responsive to and/or configured to execute instructions stored as part of software, hardware, integrated circuits, firmware, micro-code, or the like.

In addition, one or more of the systems 102, 108, 110, 112, 114, 116, 130, 132, and 134 may each include a memory M in communication with the processor P. The memory M may be non-transitory computer readable storage media. The computer readable storage media may include various types of volatile and non-volatile storage media, including but not limited to random access memory, read-only memory, programmable read-only memory, electrically programmable read-only memory, electrically erasable read-only memory, flash memory, magnetic tape or disk, optical media, and the like. The memory M may be a single device or a combination of devices. The memory M may be adjacent to, part of, networked with and/or remove from the processor. Logic encoded in one or more tangible media for execution is defined as the instructions that are executable by the programmed processor P and that are provided on the computer-readable storage media, memories, or a combination thereof.

The memory M may be a computer readable storage media having stored therein data representing instructions executable by the programmed processor P. The memory M may store instructions for the processor P. The processor P may be programmed with and execute the instructions. The functions, acts, methods, or tasks illustrated in the figures or described herein may be performed by the programmed processor P executing the instructions stored in the memory M. The functions, acts, methods or tasks may be independent of the particular type of instructions set, storage media, processor or processing strategy and may be performed by software, hardware, integrated circuits, firmware, micro-code, and the like, operating alone or in combination. The instructions may be for implementing the processes, techniques, methods, or acts described herein.

Additionally, the systems 102, 108, 110, 112, 114, 116, 130, 132, 134 may include one or more interfaces (I/F) in communication with the processor P and the memory M, and that may be used to communicate information with each other over the network 110. For some example configurations of the communication system 100, the systems 102, 108, 110, 112, 114, 116, 130, 132, 134 may be configured as network systems or devices configured to communicate over a network, such as an Ethernet Audio-Video Bridging (AVB) network, a Media Oriented Systems Transport (MOST) network, or other vehicle network, as examples. For these configurations, the interface I/F may be a network interface and/or implemented in hardware, such as a hard-wired or wireless network interface. Alternatively, one or more of the interfaces I/F may be non-network I/F and/or some or all of the systems may communicate with each other over non-network connections. In addition or alternatively, the interface I/F may be a universal asynchronous receiver/transmitter (UART), a parallel digital interface, a software interface, Ethernet, or any combination of known or later developed software and hardware interfaces. Various configurations are possible.

In addition, the modules and sub-modules, including the navigation module 104, the collision avoidance module 106, the lane detection module 118, and the zone analysis module 128 may be implemented in hardware or a combination of hardware and software. In addition, the modules 104, 106, 118, 128 may be implemented using any of the above-described processor P, memory M, interface I/F, or combinations thereof. For example, the functions of the above-described modules may be performed by at least one processor P. In addition or alternatively, the modules may include data representing instructions that are stored in the memory M and executable by at least one processor P. Additionally, the interface modules may be implemented using one or more interfaces (I/F). Various configurations are possible. In addition or alternatively, the modules and sub-modules may each include one or more executable modules, at least some of which may be embodied in a computer readable storage medium as executable instructions. Accordingly, as described herein, the modules and sub-modules are defined to be hardware executable by the processor P, such as a computer readable storage medium that may include instructions executable by the processor P, a field programmable gate array (FPGA), and/or various devices, components, circuits, gates, circuit boards, and the like that are executable, directed, and/or controlled for performance by the processor P.

Additionally, some alternative example configurations of the communication system 100 may include less than all or more than the systems and modules shown in FIG. 1. For example, an alternative configuration of the communication system 100 may not include a lane detection module 118. In addition or alternatively, an alternative output system may include fewer than or additional output components than the output components 120-126 shown in FIG. 1. Also, FIG. 1 shows the navigation module 104 and the collision avoidance module 106 as different modules that are part of the same system 102. In alternative configurations, the navigation and collision avoidance modules 104, 106 may be considered separate systems or modules that are part of separate or different systems. In addition, the integrated navigation and collision avoidance system 102 is described above as being used for a single source object or with a single communication system or vehicle system. In alternative configurations, a single integrated navigation and collision avoidance system 102 may be implemented for multiple source objects in multiple surrounding environments. Various configurations are possible.

In addition, some or all of the components of the communication system 100 may be included and/or housed in a single electronic device or apparatus or a plurality of electronic devices. As an example, the integrated navigation and collision avoidance system 102, including the navigation module 104 and the collision avoidance module 106, may be included in a single electronic device or apparatus. In an alternative example embodiment, the navigation module 104 may be included in one electronic device, and the collision avoidance module 106 may be included in another or separate electronic device, and the two electronic devices may be configured to communicate with each other. The two electronic devices may be parts or components of the integrated navigation and collision avoidance system 102. Various configurations are possible.

Figure 3:
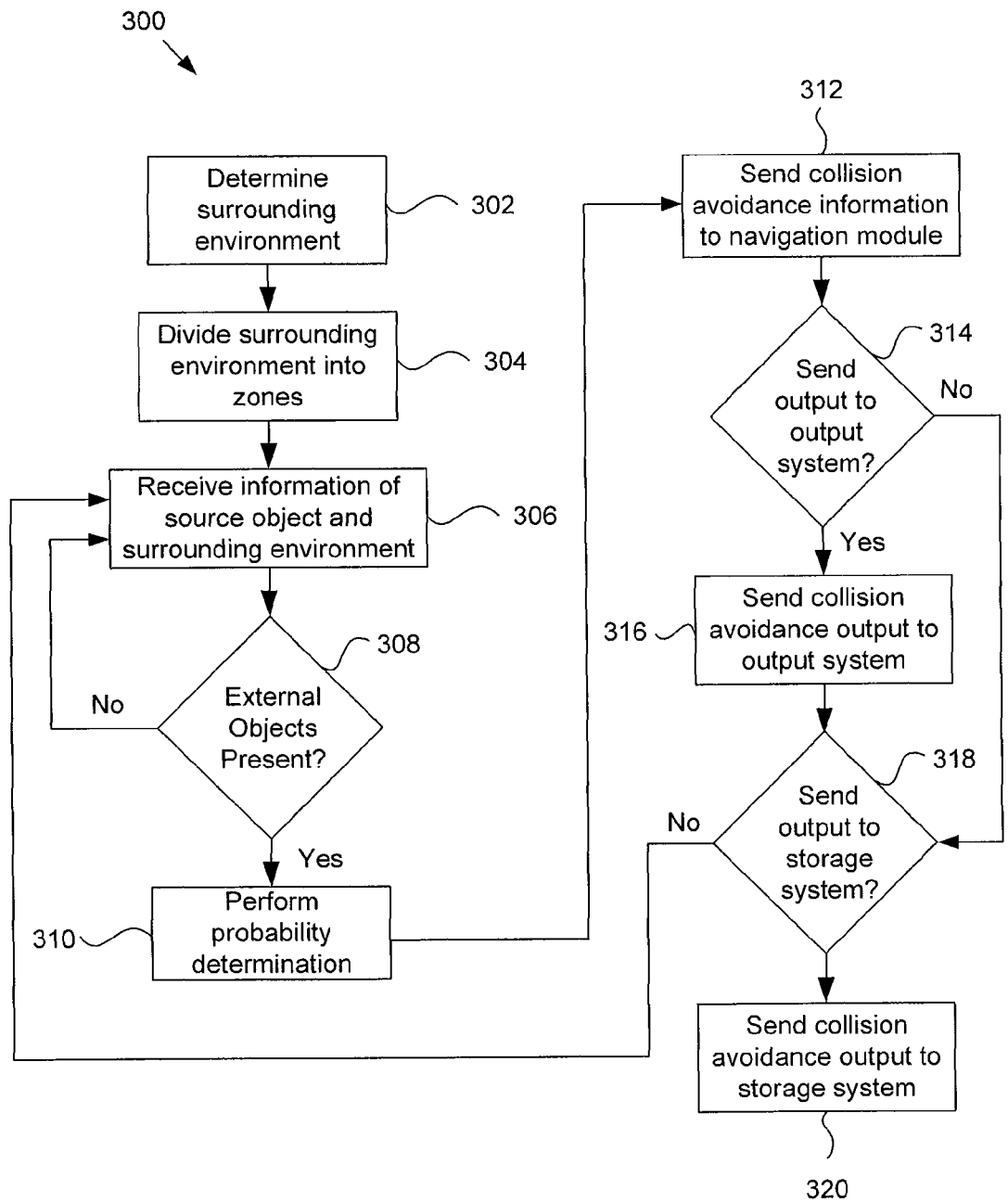
FIG. 3 is a flow chart of an example method of performing a collision avoidance analysis based on navigation information.

FIG. 3 shows a flow chart of an example method 300 of performing a collision avoidance analysis based on navigation information. At block 302, a zone analysis module may determine a surrounding environment of a source object. At block 304, the zone analysis module may divide the surrounding environment into multiple zones. At block 306, the zone analysis module may receive information indicative of properties and/or conditions of the source object and the surrounding environment from information gathering systems and/or image analysis systems. At block 308, the zone analysis module may determine whether any external objects are present in the surrounding environment. If the zone analysis module does not identify any external objects in the surrounding environment, then the method may proceed back to block 306, where the zone analysis module may receive updated information indicative of properties of the source object and the surrounding environment.

Alternatively, if the zone analysis module identifies one or more external objects in the surrounding environment, then at block 310, the zone analysis module may perform a probability determination for each of the external objects. The probability determination may include a probability or a likelihood of a collision between the source object and the identified external object. The probability determination may be based on one or more properties of the external object relative to the source object, such as a zone in which the external object is located, a speed, and/or a direction of the external object. The probability determination may also be based on navigation information received from a navigation module. The navigation information may include pending navigation instructions. The probability determination may include a likelihood of a collision with the source object in the event the source object follows the pending navigation instructions. In addition, at block 310, the zone analysis module may determine a type of a possible collision with the external object, such as a location or area of impact with the external object.

At block 312, the zone analysis module may send collision avoidance information to the navigation module. The collision avoidance information may include information identifying the external object and properties associated with the external object. In addition, the collision avoidance information may include the probability determination and/or the type of possible collision.

At block 314, the zone analysis module may determine whether to send a collision avoidance output to an output system for notification or warning of a possible collision to the source object and/or a user or operator of the source object. The determination may be based on a comparison of the probability determination with a predetermined threshold. If the probability determination is below the predetermined threshold, then the zone analysis module may determine not to output a collision avoidance output to the output system and the method may proceed to block 318. Alternatively, if the probability determination meets or exceeds the predetermined threshold, then at block 316, the zone analysis module may send a collision avoidance output to the output system. The type and/or content of the collision avoidance output may vary, depending on the output component, such as an audio system or a video system, that is outputting the collision avoidance output.

At block 318, the zone analysis module may determine whether to send a collision avoidance output to a storage system, such as a black box. The zone analysis module may make the determination based on the probability determination and/or based on the zone in which the external object is located. If the zone analysis module determines not to send a collision avoidance output to the storage system, then the method may proceed back to block 306, where the zone analysis module may receive information indicative of properties of the source object and the surrounding environment from information gathering systems and/or image analysis systems. Alternatively, if the zone analysis module determine to send a collision avoidance output to the storage system, then at block 320 the collision avoidance output may be sent to the storage system. The collision avoidance output may include various information and/or properties describing the source object and the surrounding environment of the source object. After the collision avoidance output is sent to the storage system, the method may proceed back to block 306, where the zone analysis module may receive information indicative of properties of the source object and the surrounding environment from information gathering systems and/or image analysis systems.

Figure 4:
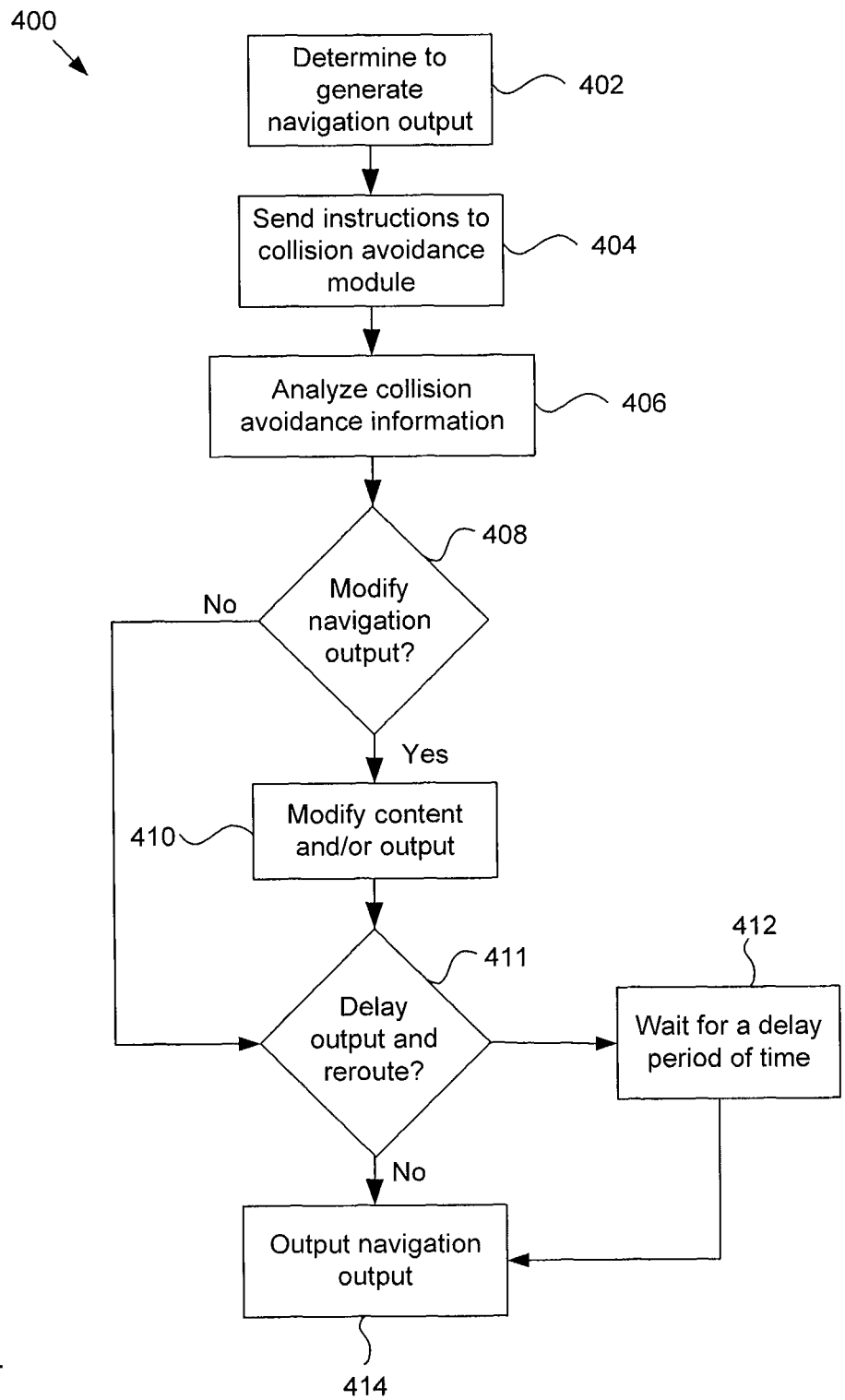
FIG. 4 is a flow chart of an example method of generating a navigation output based on collision avoidance information.

FIG. 4 shows a flow chart of an example method 400 of generating a navigation output based on collision avoidance information. At block 402, a navigation module may determine to generate and output a navigation output. The navigation output may include navigation instructions or directions, such as pending or next navigations instructions or directions for a source object to follow to reach a destination location. The navigation module may determine to generate and/or output the navigation output in response to a triggering event. The triggering event may include an identification of a current geographical location of the source object with reference to a route chosen by the navigation module for the source object to reach the destination location. In addition or alternatively, the triggering event may include an identification of the source object being a predetermined distance away from an identified geographic location and/or being at the identified geographic location within a predetermined amount of time. The identified geographic location may be associated with the chosen route.

At block 404, the navigation module may send the navigation instructions or directions to a collision avoidance module for a probability determination of a likelihood of collision based on the navigation instructions. The probability determination may include a likelihood of collision with an external object in the event the navigation instructions or directions are followed.

At block 406, the navigation module may analyze collision avoidance information received from a collision avoidance module. The collision avoidance information may be received in response to sending the navigation instructions. Alternatively, at least some of the collision avoidance output may be received independent of sending the navigation instructions or directions. As examples, the collision avoidance module may send collision avoidance information periodically, when a new collision analysis is performed, and/or when the surrounding environment changes, regardless of whether the navigation module sends a pending navigation instruction or direction. The collision avoidance information may include the probability determination. In addition, the collision avoidance information may include information associated with the probability determination, such as information about an external object, such as its type, its position, its speed, its direction of movement relative to the source object, as examples.

At block 408, the navigation module may determine whether to modify the navigation output based on the collision avoidance information. The determination may be based on the probability determination and/or a comparison of the probability determination with a predetermined threshold. For example, if the probability determination indicates a relatively low degree of likelihood of collision or a level that is below the predetermined threshold, then the navigation module may determine to generate and/or output the navigation output as originally intended without modification. Alternatively, if the probability indicates a relative high degree of likelihood of collision or a level that meets or exceeds a predetermined threshold, then the navigation module may determine to modify the content and/or output of the navigation output. If the navigation module determines not to modify the navigation output, then the method may proceed to block 411, where the navigation module may determine whether to delay or postpone the output.

Alternatively, if the navigation module determines to modify the navigation output, then at block 410, the navigation module may determine the modified content and/or the modified output. For example, the navigation module may determine whether to modify the navigation instructions or directions to different instructions or directions. In addition or alternatively, the navigation module may determine to include information directly from the collision avoidance information, such as information about an external object. In addition or alternatively, the navigation module may determine to include words or terms associated with the collision avoidance information, such as words or terms associated with a degree likelihood of collision or a position in the zone of an external object. In addition or alternatively, the navigation module may determine to modify a timing of the navigation output. The method may then proceed to block 411.

At block 411, the navigation module may determine whether to delay the output. For example, the navigation module may determine to wait to output the navigation output until after an external object moves away from a particular zone and there is no longer a high degree of likelihood of a collision. If the navigation module determines not to delay the output, then the method may proceed to block 414. Alternatively, if the navigation output determines to delay the output, then the method may proceed to block 412, where the navigation module may wait for a period of delay. The method may then proceed to block 414. At block 414, the navigation module may output the navigation output to an output system, where the navigation instructions may be output to the source object and/or an operator of the source object.

While various embodiments in the description have been described, it will be apparent to those of ordinary skill in the art that many more embodiments and implementations are possible within the scope of the description. Accordingly, the description is not to be restricted except in light of the attached claims and their equivalents.

I claim:

1. An integrated navigation and collision avoidance system for a source object, the system comprising:
 a processor configured with a plurality of modules stored in non-transitory memory, the plurality of modules comprising a navigation module and a collision avoidance module, wherein the collision avoidance module comprises executable instructions that when executed by the processor cause the collision avoidance module to:
  receive navigation instructions for the source object from the navigation module;
  receive external object information identifying an external object, the external object being external to the source object and located in at least one of a plurality of concentric zones dynamically dividing a surrounding environment of the source object;
  perform a collision avoidance analysis based on the external object information and the navigation instructions;
  communicate collision avoidance information generated from the collision avoidance analysis to the navigation module; and
 wherein the navigation module comprises executable instructions that when executed by the processor cause the navigation module to:
  generate a navigation output in response to receipt of the collision avoidance information; and
  output the navigation output to an output system.

2. The system of claim 1, where the collision avoidance analysis comprises a probability determination of a likelihood of collision of the source object with the external object.

3. The system of claim 2, where the probability determination comprises a likelihood of a collision of the source object with the external object in event that the navigation instructions are followed by the source object.

4. The system of claim 2, where the collision avoidance module is further configured to:
 send a collision avoidance output to the output system for warning or notification of the collision in response to a comparison of the probability determination with a predetermined threshold.

5. The system of claim 1, where the collision avoidance module is configured to receive external object information from an image analysis system configured to analyze images of the surrounding environment captured from a camera system.

6. The system of claim 1, where, to generate the navigation module in response to the collision avoidance information, the navigation module is configured to at least one of:
 modify the navigation instructions;
 include at least a portion of the received collision avoidance information into the navigation output; or
 select a term associated with the received collision avoidance information and include the selected term in the navigation output.

7. An electronic device comprising a processor configured with a collision avoidance module stored in non-transitory memory, the collision avoidance module comprising executable instructions that when executed by the processor cause the collision avoidance module to:
 divide a surrounding environment of a source object into a plurality of concentric zones;
 receive external object information identifying an external object in at least one of the plurality of concentric zones;
 receive navigation information for the source object;
 perform a collision avoidance analysis based on the plurality of concentric zones, the external object information, and the navigation information; and
 output collision avoidance information generated from the collision avoidance analysis for a navigation analysis.

8. The electronic device of claim 7, where the collision avoidance module is configured to determine a probability determination of a likelihood of a collision of the source object with the external object to perform the collision avoidance analysis.

9. The electronic device of claim 8, where the navigation information comprises pending navigation instructions, and where the probability determination is based on the pending navigation instructions.

10. The electronic device of claim 9, where the probability determination comprises a likelihood of a collision of the source object with the external object in event that the pending navigation instructions are followed by the source object.

11. The electronic device of claim 8, where the collision avoidance module is configured to compare the probability determination with a predetermined threshold;
 and send a collision avoidance output to an output system for warning or notification of the collision in response to the comparison.

12. The electronic device of claim 7, where the collision avoidance module is further configured to send a collision avoidance output to a storage system in response to the external object information identifying the external object being in a predetermined zone of the plurality of concentric zones for transmission to the storage system.

13. The electronic device of claim 7, where the collision avoidance module is configured to receive external object information from at least one of: an image analysis system configured to analyze images of the surrounding environment captured from a camera system; or a surrounding environment sensor system.

14. The electronic device of claim 7, where the collision avoidance module is configured to dynamically modify the plurality of concentric zones based on at least one of changing conditions of the source object or changing conditions of the surrounding environment.

15. An electronic device comprising a processor configured with a navigation module stored in non-transitory memory, the navigation module comprising executable instructions that when executed by the processor cause the navigation module to:
 determine a navigation output in response to a triggering event, the navigation output comprising navigation instructions for output to an output system;
 receive collision avoidance information generated in response to a collision avoidance analysis; and
 modify at least one of a content of the navigation output or a timing of the navigation output in response to the collision avoidance information.

16. The electronic device of claim 15, where the navigation module is further configured to:
 send the navigation instructions to a collision avoidance module for performance of the collision avoidance analysis; and
 receive at least a portion of the collision avoidance information in response to the sending of the navigation instructions to the collision avoidance module.

17. The electronic device of claim 15, where the collision avoidance information comprises a probability determination of a likelihood of collision of a source object with an external object, and where the navigation module is further configured to:
  compare the probability determination with a predetermined threshold,
  where modification of at least one of the content or the timing is based on the comparison of the probability determination with the predetermined threshold.

18. The electronic device of claim 17, where the likelihood of collision of the source object with the external object comprises a likelihood of collision in the event that the source object follows the navigation instructions, and where the navigation module is further configure to:
  determine to modify at least one of the content or the timing of the navigation output in response to the probability determination exceeding the predetermined threshold; and
  determine to keep unchanged the navigation output in response to the probability determination being below the predetermined threshold.

19. The electronic device of claim 15, where, to modify the content of the navigation output, the navigation module is configured to at least one of:
  modify the navigation instructions;
  include at least a portion of the received collision avoidance information into the navigation output; or
  select a term associated with the received collision avoidance information and include the selected term in the navigation output.

20. The electronic device of claim 15, where, to modify the timing of the navigation output, the navigation module is configured to:
  delay output of the navigation output until a probability determination of a likelihood of collision of a source object with an external object falls below a predetermined threshold.

* * * * *